United States Patent [19]
Horiuchi et al.

[11] Patent Number: 6,037,972
[45] Date of Patent: Mar. 14, 2000

[54] CAMERA

[75] Inventors: Akihisa Horiuchi; Kazuhiko Hatano, both of Kanagawa-ken; Yuji Yamamoto, Saitama-ken, all of Japan

[73] Assignee: Canon Kabushiki Kaisha, Tokyo, Japan

[21] Appl. No.: 08/543,800

[22] Filed: Oct. 16, 1995

[30] Foreign Application Priority Data

Oct. 21, 1994 [JP] Japan .................................... 6-256687
Oct. 24, 1994 [JP] Japan .................................... 6-282437
Jan. 24, 1995 [JP] Japan .................................... 7-008811

[51] Int. Cl.[7] .......................... H04N 5/238; H04N 5/235; H04N 7/18
[52] U.S. Cl. ............................ 348/64; 348/221; 348/229; 348/297; 348/348; 348/364; 396/374; 396/429
[58] Field of Search ............................. 348/64, 207, 220, 348/333, 221, 222, 229, 294, 296, 297, 345, 348–351, 354, 355, 362, 363, 364; 396/429, 373, 374, 385; H04N 7/18, 9/47, 5/238, 5/235

[56] References Cited

U.S. PATENT DOCUMENTS

| 4,330,797 | 5/1982 | Yokokawa et al. ...................... 348/333 |
| 4,704,022 | 11/1987 | Nozawa et al. .......................... 396/384 |
| 4,763,146 | 8/1988 | Niikura ..................................... 396/63 |
| 5,055,863 | 10/1991 | Lindenfelsen et al. .................... 348/64 |
| 5,126,780 | 6/1992 | Satou et al. ............................... 396/63 |
| 5,164,834 | 11/1992 | Fukuda et al. ........................... 348/333 |
| 5,543,887 | 8/1996 | Akashi ..................................... 396/51 |

FOREIGN PATENT DOCUMENTS 0273640  7/1988  European Pat. Off. ......... H04N 5/76

OTHER PUBLICATIONS

Patent Abstracts of Japan No. JP–A–62 129810, published Jun. 12, 1987, vol. 11, No. 350.

*Primary Examiner*—Wendy Garber
*Assistant Examiner*—Ngoc-Yen Vu
*Attorney, Agent, or Firm*—Robin, Blecker & Daley

[57] ABSTRACT

In a camera having a first image pickup device arranged to pick up a still image by using a silver-halide film, a second image pickup device arranged to electrically pick up a moving image by using a photoelectric conversion element, and an image pickup optical system arranged to guide an image light flux both to the first image pickup device and the second image pickup device, the image pickup optical system includes a fixed half mirror for guiding the image light flux both to the first image pickup device and the second image pickup device, a first light quantity adjusting device provided for the first image pickup device, and a second light quantity adjusting device provided for the second image pickup device.

41 Claims, 8 Drawing Sheets

CAMERA

BACKGROUND OF THE INVENTION

1. Field of the Invention

This invention relates to a compound camera consisting of a video camera and a still picture camera which is adapted for use of a film.

2. Description of the Related Art

A video camera and a still picture camera have generally been supposed to be carried around separately from each other for use of them as desired by the user. Meanwhile, there have been proposed some video camera arranged to have a still picture camera disposed within its grip or in parallel with it within a common casing and some single-lens reflex type still picture camera arranged to have a video camera unit mounted thereon by modifying its viewfinder part.

For example, U.S. Pat. No. 3,546,375 discloses a camera which is arranged to have a movable mirror disposed within the optical path of an objective lens for shooting and to be capable of recording a still picture and a motion picture respectively on different recording media by selectively switching the position of the movable mirror from one position over to another.

Japanese Laid-Open Utility Model Application No. SHO 57-96444 discloses a video camera in which an optical shooting part for taking pictures on a silver-halide film is arranged either to be built in the body of the video camera or to be detachably mountable on the video camera body as a discrete unit.

Further, Japanese Laid-Open Patent Application No. HEI 1-185533 also discloses a compound camera. This compound camera is arranged to provide a display on a monitor to permit confirmation of an image signal which corresponds to an image to be formed on a silver-halide film and which is obtained by a photoelectric conversion element.

However, none of these prior art examples have sufficiently provided the following necessary means:

(i) Some arrangement necessary in recording a silver-halide still image and a moving video image simultaneously and at the same angle of view;

(ii) Means for carrying out functions both for a still picture camera and a video camera in common to permit reduction in size in combining them into one apparatus;

(iii) Technological means for saving electric energy to be included in combining a still picture camera and a video camera into one apparatus; or (iv) Means for preventing the audio recording of a video camera from being affected by various driving sounds which are allowable for the conventional silver-halide type still picture camera.

Further, Japanese Laid-Open Patent Application No. SHO 63-247738 has proposed a compound camera, which is arranged to control the apertures and the focal lengths of both still-picture camera and video camera parts. However, the proposition relates only to control over the respective lenses for taking a still image and a moving video image and is not arranged to meet the requirement mentioned in the paragraph (i) above.

Besides, the arrangement of the compound camera of the prior art to simultaneously record a silver-halide still image and a moving video image has been inadequate with respect to exposure control for obtaining the two images in adequate states.

SUMMARY OF THE INVENTION

In accordance with one aspect of this invention, there is provided a compound camera having both a first image pickup device for a still image and a second image pickup device for a moving image, in which a fixed half mirror is used to guide an image light flux both to the first image pickup device and the second image pickup device, so that the still image and the moving image can be picked up concurrently without the need of enlarging the camera.

In accordance with another aspect of this invention, there is provided a compound camera having both a diaphragm for film and a diaphragm for video provided in an optical system, in which a stopping-down action of the diaphragm for film is restricted in taking a still image shot while video shooting is in process, so that video images can be prevented from being affected by still image shooting.

In accordance with a further aspect of this invention, there is provided a compound camera having both a diaphragm for film and a diaphragm for video provided in an optical system, in which correcting means is provided for performing a predetermined process on a video image obtained when the diaphragm for film is stopped down, so that the video image thus processed can be prevented from giving any disagreeable impression even at the time of taking a still image shot.

These and other aspects and features of this invention will become apparent from the following detailed description of embodiments thereof taken in conjunction with the accompanying drawings.

DETAILED DESCRIPTION OF THE PREFERRED EMBODIMENTS

Figure 1:
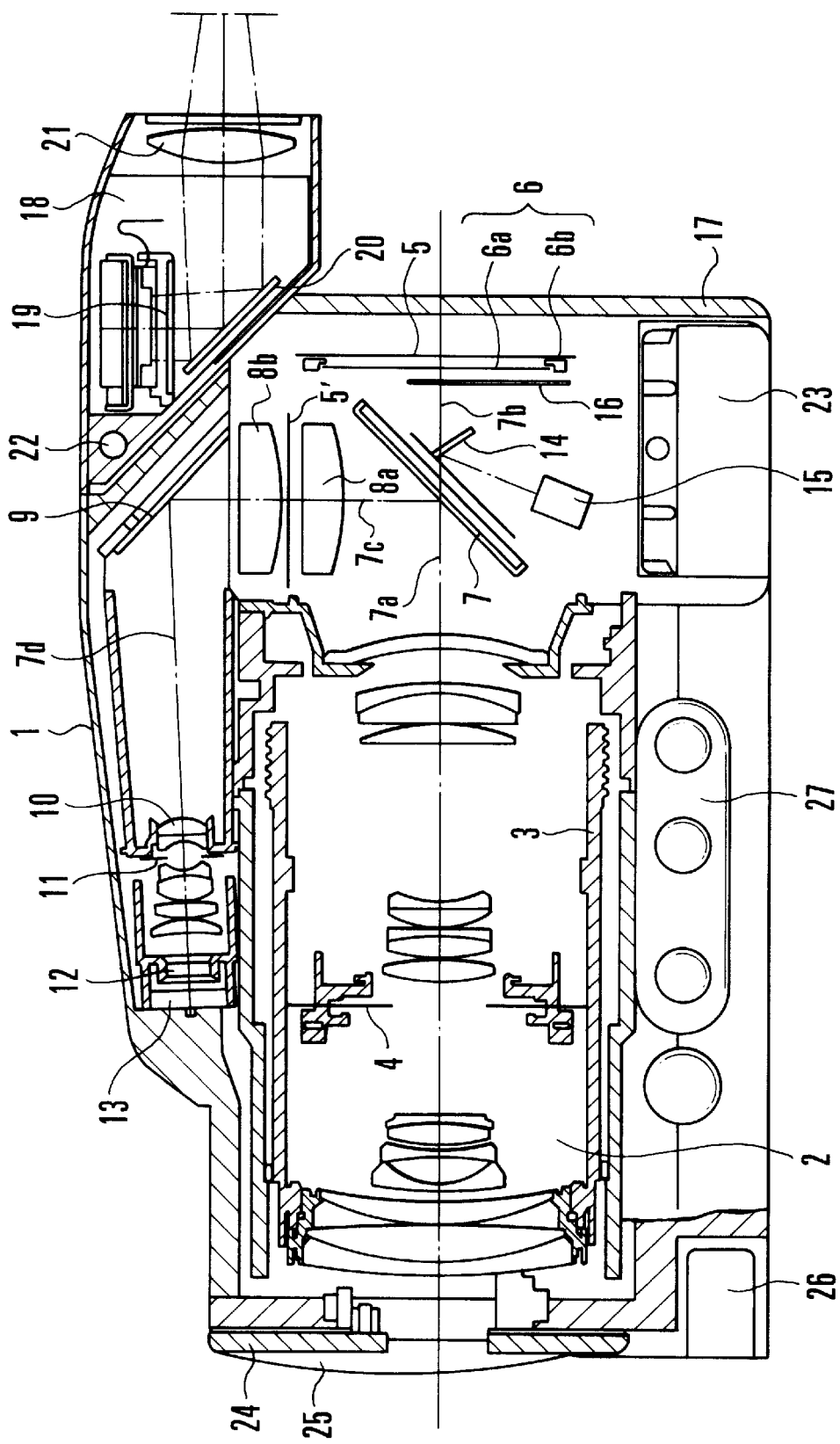
FIG. 1 is a side sectional view showing the arrangement of a camera according to this invention.

FIG. 1 is a left-side sectional view showing the functions of a compound camera which is arranged according to this invention. Referring to FIG. 1, an exterior cover 1 of the camera is composed of several parts connected with some tightening connection parts such as screws. A lens unit 2 is arranged to take in an image onto a silver-halide film. A lens barrel 3 is arranged to carry and hold lens elements. An iris diaphragm 4 is provided for taking a silver-halide picture. A silver-halide film 5 is used for still image shooting. In this case, the lens unit 2 is a zoom lens, which includes a variator lens element group which is arranged to be movable on an optical axis in response to an automatic or manual zoom operation, and a focusing lens element group which is arranged to be driven in accordance with information from an automatic focusing device.

A shutter device 6 is disposed immediately before the silver-halide film 5 and includes a shutter curtain 6a and a shutter frame 6b. A semi-transparent thin-film mirror 7 is arranged to allocate an image coming from an object of shooting both to the silver-halide film and a video image sensor (a solid-state image pickup element). Reference numeral 7a denotes an optical axis of light incident on the object side of the camera. Reference numeral 7b denotes an optical axis of light coming to the silver-halide film through the semi-transparent thin-film mirror 7. Reference numerals 7c and 7d denote optical axes of light reflected by the semi-transparent thin-film mirror 7. Field lenses 8a and 8b are arranged on the optical axis 7c for pupil adjustment of the image of an object of shooting. A reflecting mirror 9 is arranged to deflect the optical axis 7c which is a shooting optical axis. A reducing lens unit 10 is disposed on the optical axis 7d and includes therein a video diaphragm 11 which is provided for shooting a moving video image. Reference numeral 12 denotes an optical low-pass filter. A solid-state image pickup element 13 (CCD), i.e., an image sensor, is provided for video image shooting. Reference numeral 5' denotes an aerial image formed in the air in a position equivalent to the position of the silver-halide film 5. The aerial image 5' is re-formed on the solid-state image pickup element 13 via the above-stated reducing lens unit 10. A submirror 14 is arranged in rear of the semi-transparent thin-film mirror 7 to guide a part of shooting light to an automatic focus detecting device 15 and to be retractable at the time of shooting. In the case of this embodiment, the automatic focus detecting device 15 is of a known phase-difference deviation detecting type and is arranged to detect a defocus amount on the surface of the film 5 and the direction of focusing (a near- or far-focus state) by comparing a plurality of images formed by light fluxes passing through different areas of the photo-taking lens. However, since an object image is always obtained on the solid-state image pickup element 13, the automatic focus adjustment may be carried out by a known blur detecting method on the basis of a high frequency video signal coming from the solid-state image pickup element 13 or by a combination of the blur detecting method and the phase-difference deviation detecting method of this embodiment.

A light-blocking plate 16 is provided for the purpose of preventing rays of light from leaking through the semi-transparent thin-film mirror 7 and is arranged to be retracted at the time of shooting. A back lid unit 17 is arranged to be opened and closed in loading the silver-halide film 5. In the case of this particular embodiment, a silver-halide film called the type 135 is used. However, the film is not limited to this type. A film of a drop-in type or a disk type may be used. An electronic viewfinder unit 18 is provided for monitoring video signals obtained from the solid-state image pickup element 13 and is arranged to have video images outputted to a compact liquid crystal display device 19 to permit observation of the video images through a reflection mirror 20 and an eyepiece 21. The viewfinder unit 18 is arranged to be swingable on a revolving shaft 22 which is arranged to carry the viewfinder unit 18.

In the arrangement as shown in FIG. 1, the iris diaphragm 4 which is provided for taking a shot of a silver-halide still image is always left open while the camera is in process of shooting a moving video image. The iris diaphragm 4 is stopped down to a predetermined aperture diameter when a release switch which is provided for shooting a silver-halide still image is pushed. At the time of shooting a moving video image, therefore, exposure control is performed by using only the video diaphragm 11 which is included in the reducing lens unit 10. Then, an adequate exposure is made by varying the accumulation time of the image sensor (image pickup element) 13 and the gain of a signal processing system as necessary.

A secondary battery 23 is removably mounted on a bottom part of the camera and serves as a common single power source arranged to supply the power to be used by the whole camera. A barrier 25 in which a flash device 24 is incorporated is arranged in front of the lens unit 2 to be openable and closable as desired. A microphone 26 is provided for audio recording at the time of video shooting. An external terminal group 27 is arranged to serve as an interface for external devices such as a TV set and a stereophonic device.

Figure 2:
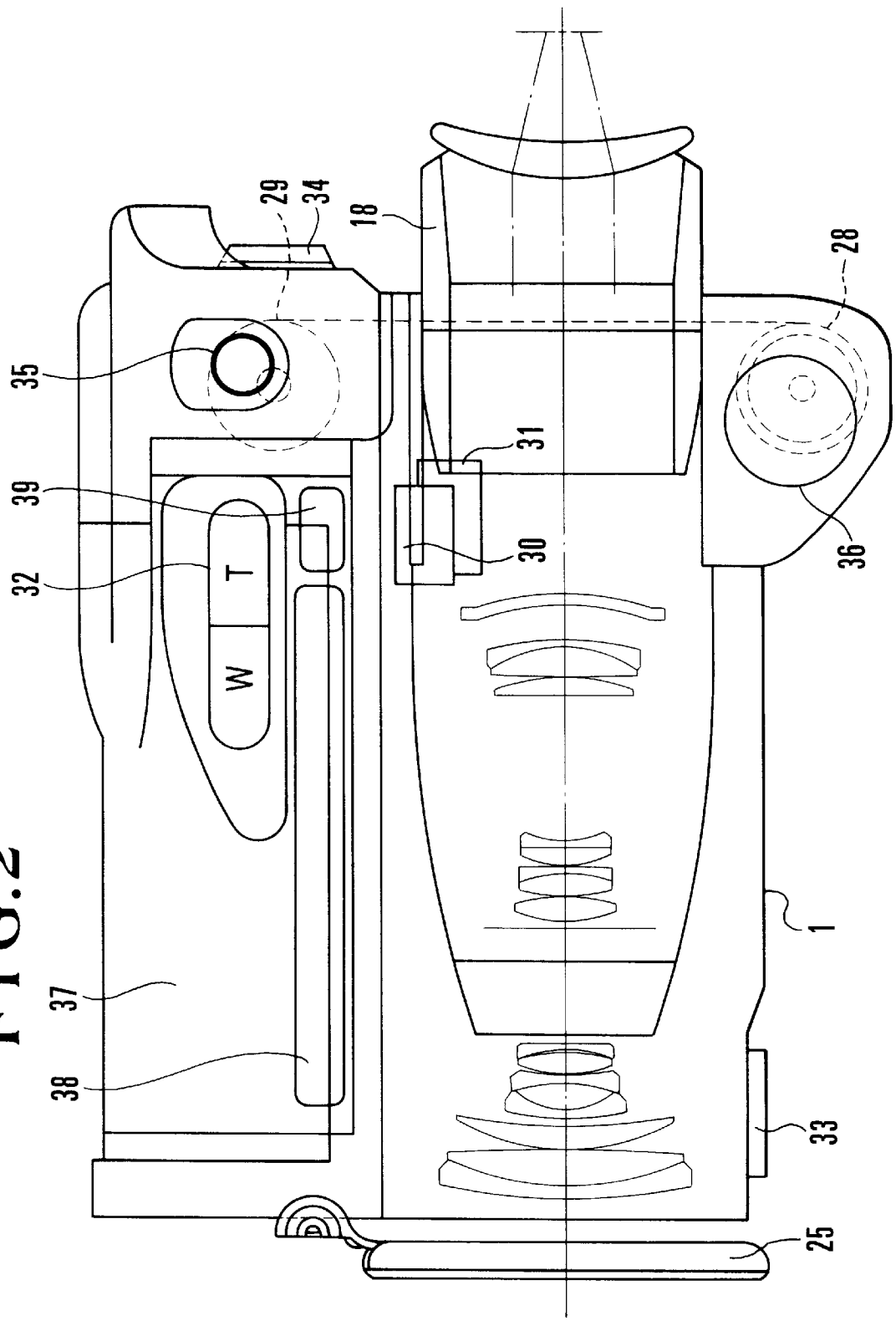
FIG. 2 is a top view showing the arrangement of the camera according to this invention.

FIG. 2 is a top view showing the above-stated embodiment. Referring to FIG. 2, a cartridge chamber 28 is arranged to have the cartridge of the silver-halide film 5 loaded therein. A spool 29 is arranged to have the film wound thereon. In the case of this embodiment, the film is wound up on the spool 29 to the last frame portion of the film at the time of loading the camera with the film in a manner called the prewinding method.

Motors 30 and 31 are arranged to be used for driving the photo-taking lens in zooming and focusing, respectively. A zoom button 32 is disposed in a position where it can be operated by the right hand of the camera operator (user). A main mode selection switch 33 is arranged to serve also as a power supply switch. A trigger button 34 is provided for triggering moving video image shooting. A still image shooting shutter button 35 is arranged to permit taking a shot of a silver-halide still image either alone or simultaneously with video moving image shooting. On one side of the camera opposite to the side on which these operation members are disposed, there is disposed a mode selection dial 36 which is arranged to be usable for selecting a programmed exposure mode, a portrait mode for a maximum aperture, a sport mode which gives priority to a shutter speed, a back-light shooting mode, etc., in both moving image shooting and still image shooting.

A light measuring action is feedback-controlled according to the level of a luminance signal obtained from the solid-state image pickup element (image sensor) 13. The area of the image sensor 13 for video shooting is electrically divided in such a way as to permit use of the image sensor 13 also as a light measuring element. This arrangement, however, may be changed to arrange a light measuring element separately from the image sensor 13.

A video tape cassette housing part 37 is disposed on the right side of the lens unit 2. In the case of this particular embodiment, a video tape which measures 8 mm in width and is stowed in a tape cassette is employed as a video recording medium. The video tape cassette housing part 37 is provided with a recording mechanism including a magnetic head cylinder, a capstan, a pinch roller, etc. Above the video tape cassette housing part 37, there are provided a control panel 38 for controlling various actions including recording and reproduction on or from the video tape and an eject button 39 which is arranged to give an instruction for automatic loading.

Figure 3:
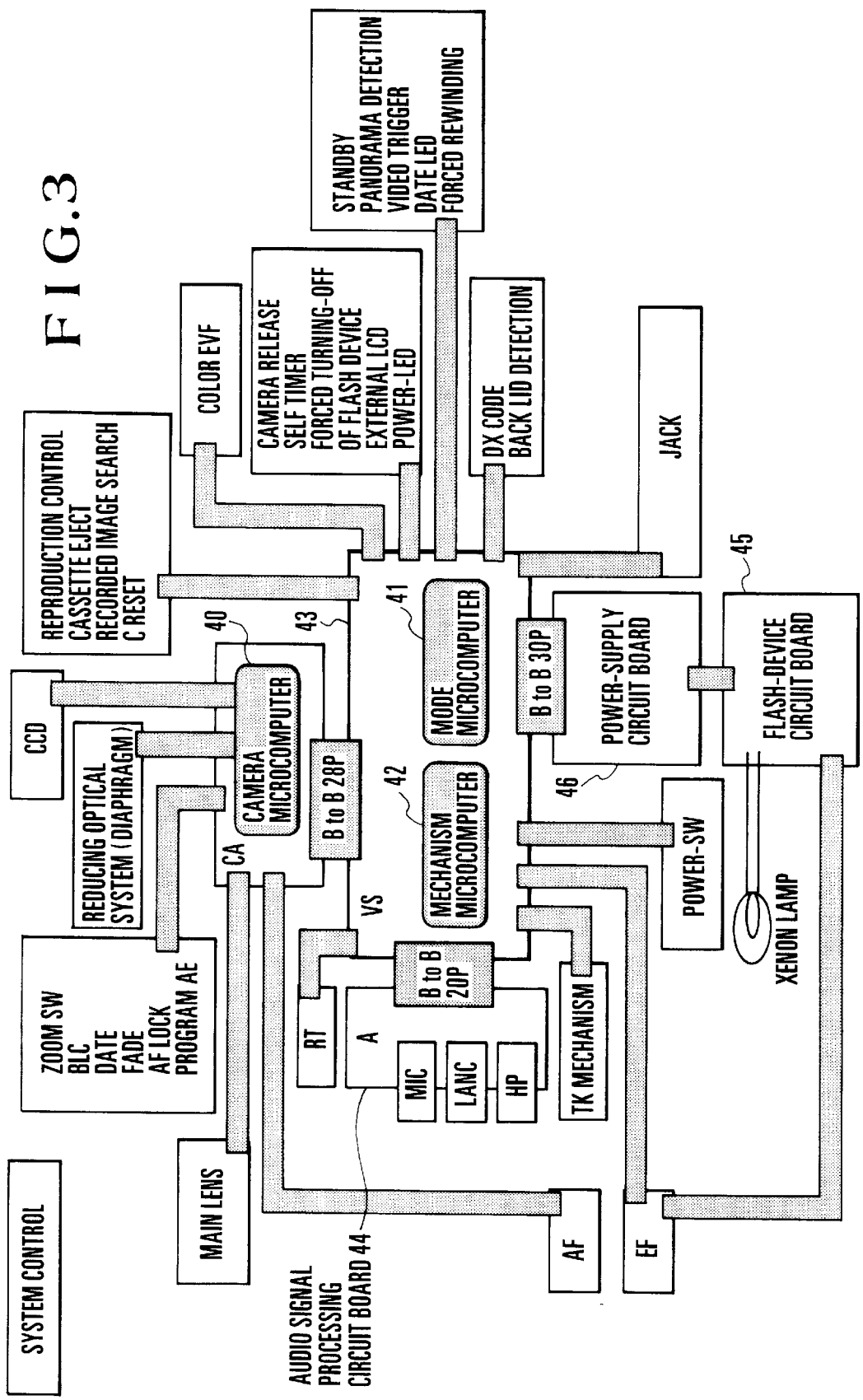
FIG. 3 is a block diagram showing the system arrangement of a first embodiment of this invention.

FIG. 3 is a block diagram showing the system control arrangement of the embodiment described. The arrangement is roughly divided into a camera microcomputer 40 which serves as control means for controlling camera actions, such as zooming, exposure and automatic focusing, by receiving inputs indicative of operations performed for these actions; a mode microcomputer 41 which serves as control means for controlling a release action on the camera body and setting a mode; a mechanism microcomputer 42 which serves as control means for controlling the driving actions of a servo mechanism for recording and reproduction on or from the tape. With these microcomputers 40, 41 and 42 arranged as nucleuses, other parts such as a video signal processing circuit board 43, an audio signal processing circuit board 44, a flash-device circuit board 45 and a power-supply circuit board 46 are arranged in association with these microcomputers 40, 41 and 42.

Figure 4:
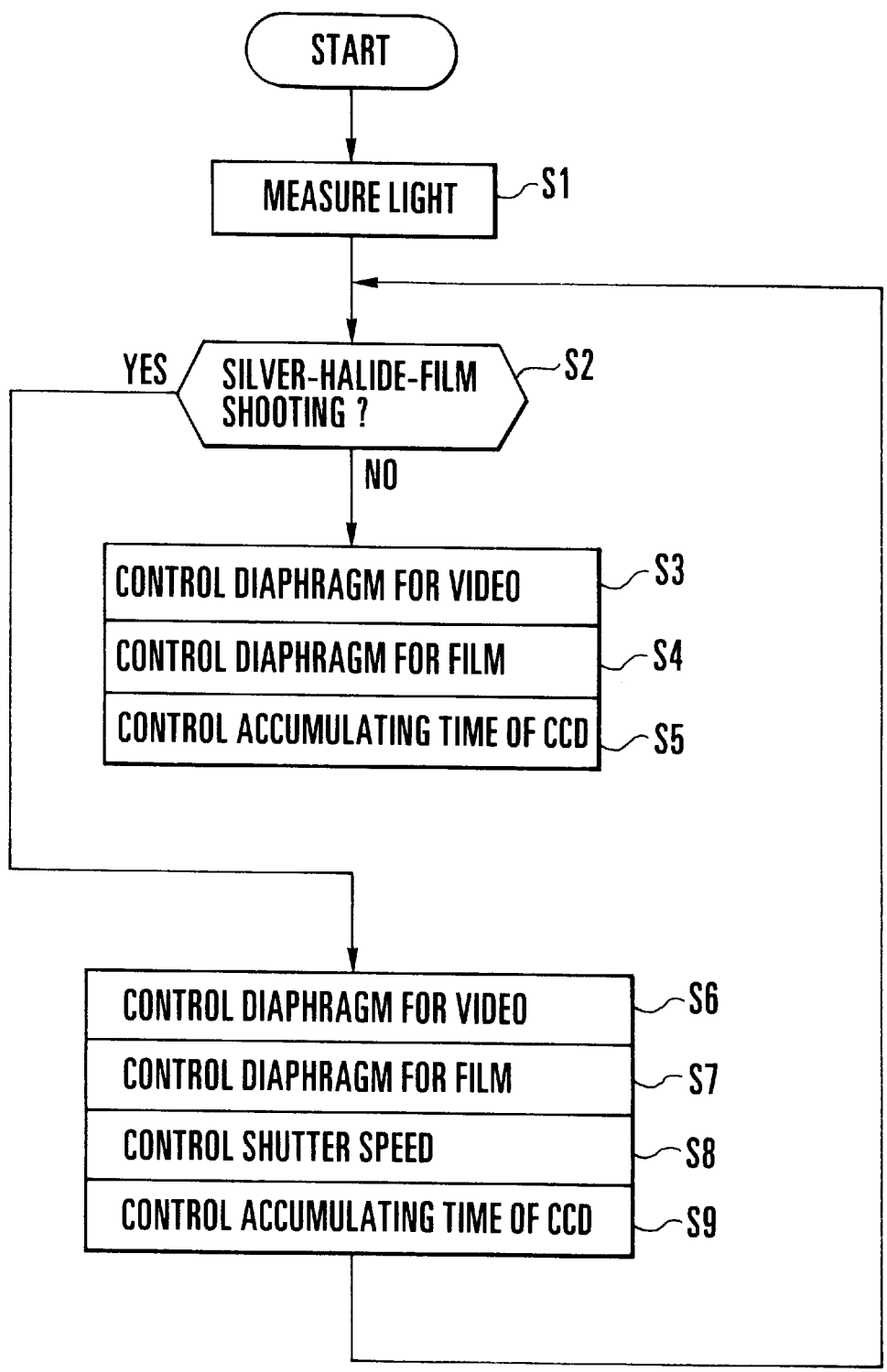
FIG. 4 is a flow chart showing the operation of the first embodiment of this invention.

With the camera arrangement as described above, its operations are described as a first embodiment of this invention, with reference to a flow chart shown in FIG. 4, as follows. Referring to FIG. 4, at a step S1, a light measuring action is performed. At a step S2, a check is made for silver-halide-film shooting.

(1) In the case of video shooting only, the flow of operation comes from the step S2 to a step S3. At the step S3, the video diaphragm 11 which is included in the reducing lens unit 10 is operated to open or close its aperture in such a way as to cause the quantity of light received through the image sensor (CCD) 13 (a solid-state image pickup element) at the step S1 to become a reference value. The quantity of light reaching the image sensor (CCD) 13 is thus limited by means of the video diaphragm 11. At a step S4, the iris diaphragm 4 for the silver-halide film is left in its maximum aperture position (a full-open state) for the purpose of ensuring that video shooting can be carried on at an apposite exposure. The electric energy can be saved by this from being wasted by unnecessarily driving the iris diaphragm 4. The iris diaphragm 4 for the silver-halide film is larger than the video diaphragm 11 and thus generates a noise when it is driven. However, the control arrangement of leaving the iris diaphragm 4 in the full open state prevents the iris diaphragm 4 from making the noise. Further, in a case where the luminance of the object of shooting is low, the quantity of light is below the reference value even with the video diaphragm 11 opened up to its maximum aperture position. In that case, a control action is performed at a step S5 to increase the accumulation time of the image sensor (CCD) 13.

(2) When it is desired to take a photograph on the silver-halide film while the camera is in process of video shooting, the picture can be taken, for example, by pushing the shutter button 35. In this instance, the flow of operation comes from the step S2 to a step S6. At the step S6, if the object is at an ordinary degree of luminance, the video part of the camera decides the aperture value position of the video diaphragm 11 which is within the reducing optical system (the reducing lens unit) 10 according to the accumulation time of the image sensor (CCD) 13 and the luminance of the object obtained by the step S1. At steps S7 and S8, the silver-halide photographing part of the camera decides a shutter speed and the aperture value position of the iris diaphragm 4 for the silver-halide film on the basis of above-stated information according to the sensitivity of the film in use, the focal length of the photo-taking lens, an F number and a T number $$[T = (F/\sqrt{\tau}) \times 10,$$

wherein τ represents the transmission factor of the lens]. In this instance, the aperture value position of the iris diaphragm 4 for the silver-halide film is controlled according to a shutter speed selected in an applicable mode among various shooting modes. Through these steps S7 and S8, it becomes possible to take a silver-halide picture at an apposite exposure. In a case where a picture is to be taken by using the flash device, the above-stated aperture value is controlled by taking into consideration also information on the object distance and information on an amount of flashing.

In this instance, the shutter speed is decided and the aperture diameter of the iris diaphragm 4 for the silver-halide film is controlled in such a way as to cause the diameter of a light flux reaching the image sensor (CCD) 13 to become less than the diameter of a light flux which passes through the iris diaphragm 4 for the silver-halide film. This method of control is preferable as it allows video shooting to be carried on without giving any disagreeable image. More specifically, the aperture value of the video diaphragm 11 controlled by the step S6 and the aperture value of the diaphragm 4 for the film decided by the step S7 are compared with each other. If the light flux diameter adjusted by the iris diaphragm 4 becomes smaller than the light flux diameter obtained through the diaphragm 11, the aperture diameter of the iris diaphragm 4 is increased and the shutter speed is also shifted to a higher speed accordingly.

For a high luminance object, although the control is performed in a manner similar to the above-stated manner, the accumulation time of the image sensor (CCD) 13 is positively shortened at a step S9. If the object of shooting is dark, the aperture of the diaphragm 11 which is disposed within the reducing (reimaging) optical system 10 on the video shooting side is fully opened according to the object luminance and the accumulation time of the image sensor (CCD) 13. If the object is darker, the accumulation time of the image sensor (CCD) 13 is increased and, for example, the video signal amplifying gain is increased in processing the signal outputted from the image sensor (CCD) 13. Then, on the side of silver-halide photographing, a shutter speed and the aperture value of the iris diaphragm 4 for the silver-halide film are decided on the basis of the information thus obtained and according to the sensitivity of the film in use and the focal length and the F number of the photo-taking lens. In that instance, a silver-halide photograph can be taken at an apposite exposure by controlling the aperture position of the iris diaphragm 4 for the silver-halide film according to the shutter speed selecting method of an applicable mode among various shooting modes. In a case where the flash device 24 is to be used for the shooting, the aperture value is decided by taking information on the object distance and the amount of flashing into consideration in addition to other factors mentioned above.

As mentioned above, the shutter speed is decided and the aperture diameter of the iris diaphragm 4 is controlled in such a way as to cause the diameter of a light flux coming to the image sensor (CCD) 13 to become smaller than the diameter of a light flux which has passed through the iris diaphragm 4 for the silver-halide film. Then, the light flux coming from the video iris 11 is never blocked by the iris diaphragm 4, so that video shooting can be carried on without any disagreeable video image. Conversely, if the light flux diameter of the iris diaphragm 4 becomes smaller than the light flux diameter of the diaphragm 11 for the video shooting, the video image suddenly becomes darker to give a disagreeable or unnatural impression.

(3) In a case where the compound camera arranged according to this invention is to be used only for silver-halide film photographing, a silver-halide photograph can be taken at an apposite exposure under the same control as described in the paragraphs (2) above.

In the embodiment described, the lens unit 2 corresponds to a photo-taking lens. The semi-transparent thin-film mirror (half-mirror) 7 corresponds to a first optical member. The iris diaphragm 4 and the video diaphragm 11 correspond respectively to a diaphragm for silver-halide photography and to a video diaphragm of an image forming optical system. The reducing lens unit 10 corresponds to an image forming optical system.

While the component parts of this particular embodiment of this invention are arranged as described above, this invention is not limited to the arrangement described. The arrangement of course may be changed in any manner as long as functions defined by the appended claims and functions attained by the arrangement of the embodiment are attainable.

This invention may be carried out by combining the technological elements of embodiments as necessary.

This invention applies to cases where either the whole or a part of claims or the arrangement of each embodiment described forms one apparatus or is used in combination with some other apparatus or as a component element of an apparatus.

This invention is applicable also to optical apparatuses other than cameras, other apparatuses, devices adapted for cameras, optical apparatuses and other apparatuses, and component elements forming these apparatuses and devices.

The embodiment described in the foregoing is arranged to save electric energy by leaving the diaphragm for the silver-halide film in a predetermined open state when the camera is in process of video shooting only and by driving the diaphragm only in taking a silver-halide picture. Further, in a case where a silver-halide picture is taken while the video shooting is in process, the two diaphragms, one provided for video shooting and the other for silver-halide photography, are appositely controlled, so that both a video image and a silver-halide picture can be adequately obtained. Further, since a light flux coming to the solid-state image pickup element (image sensor) is prevented from being affected by taking (or not taking) a silver-halide picture, so that video shooting can be carried out without giving any disagreeable impression.

A second embodiment of this invention is described below with reference to FIG. 5 which shows in a block diagram the system control arrangement of the image pickup system of a camera which is the second embodiment.

Figure 5:
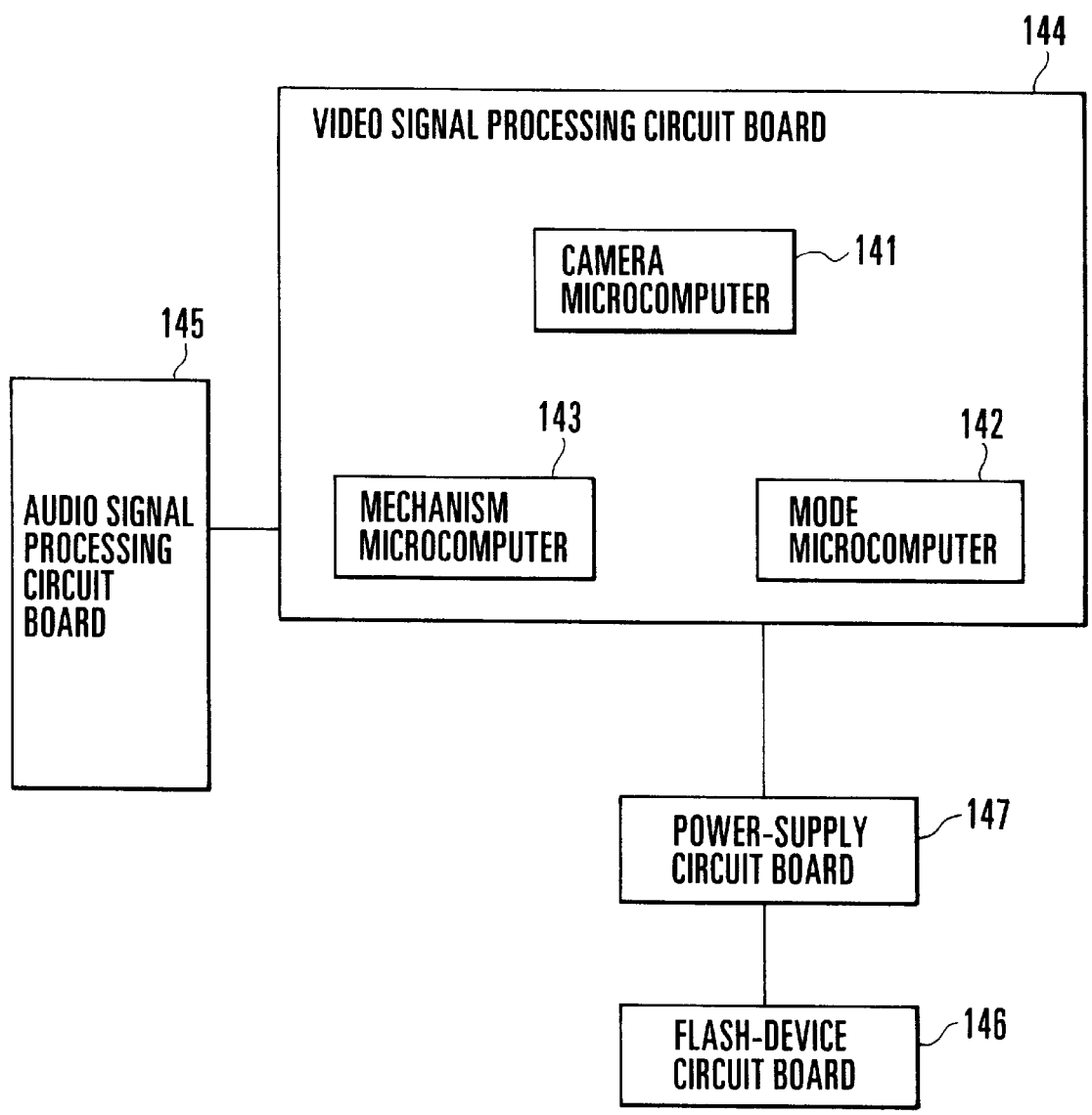
FIG. 5 is a block diagram showing the system arrangement of an image pickup system as a second embodiment of this invention.

Referring to FIG. 5, the image pickup system of the second embodiment includes a camera microcomputer 141 which is arranged to receive inputs of information on operations performed for various actions, such as zooming, exposure and automatic focusing, and to control these actions. A mode microcomputer 142 is arranged to control a release action on the camera body and a mode setting action. A mechanism microcomputer 143 is arranged to control a driving action on a servo mechanism provided for recording and reproduction on and from a tape which is a recording medium. System control means is formed jointly by these microcomputers 141, 142 and 143. The microcomputers 141, 142 and 143 are mounted on a video signal processing circuit board 144. Besides the microcomputers, the electric circuit part of the image pickup system of the embodiment includes an audio signal processing circuit board 145, a flash-device circuit board 146 and a power-supply circuit board 147.

Figure 6:
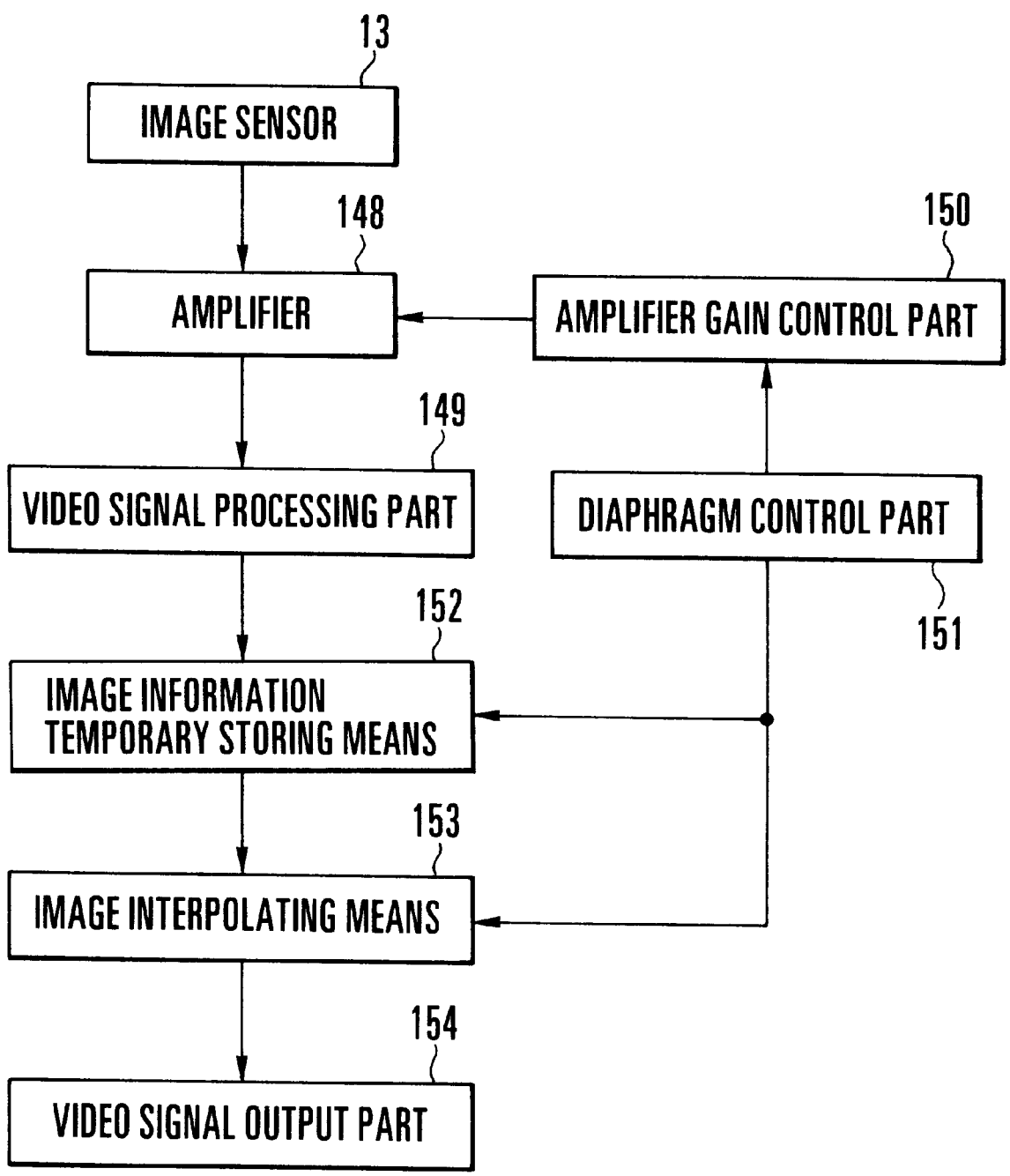
FIG. 6 is a block diagram showing the functional arrangement of a video signal processing part of the image pickup system as the second embodiment of this invention.

FIG. 6 is a flow chart showing various functions of this embodiment. A video signal processing operation which represents a feature of this embodiment is described in detail with reference to FIG. 6 as follows.

In the image pickup system of this embodiment, the iris diaphragm 4 which is disposed within the photo-taking lens is kept in a fully open state when the camera is in process of shooting moving images only and recording them on an information recording medium by using its video camera function. In this instance, a signal outputted from the image sensor 13 is amplified to a predetermined level by an amplifier 148 which serves as amplifying means. The amplified signal is converted by a video signal processing part 149 into a composite video signal which conforms, for example, to the NTSC system.

In a case where the video camera function and the silver-halide still camera function are simultaneously used to take a moving image and a still image, a portion of a light flux coming to the image sensor 13 for the moving image shooting might be blocked by the stopping-down action of the iris diaphragm 4 disposed within the photo-taking lens, In such a case, the luminance of the moving image might be caused to vary.

To prevent the luminance of the moving image from varying under that above-stated condition, this embodiment is arranged to supply information on an aperture stopping-down time and an aperture value and a signal indicative of the commencement of a stopping-down action, from a diaphragm control part 151 (diaphragm control means) to an amplifier gain control part 150 (amplifying gain control means). The luminance of the video signal is thus prevented by this arrangement from varying while the iris diaphragm 4 is in process of stopping down its aperture. For this purpose, the amplifier gain control part 150 is arranged to control the gain of the amplifier 148 according to an amplification gain computed on the basis of the aperture stopping-down time and the aperture value, in association with the stopping-down action.

However, it is sometimes difficult to adequately make the above-stated correction by means of the amplifier 148, depending on the conditions of shooting. To solve this problem the embodiment is arranged as follows. Image information obtained by the image sensor 13 is temporarily stored by an image information temporary storing means 152 immediately before the aperture position of the iris diaphragm 4 in the photo-taking lens is stopped down.

Then, in stopping down the aperture of the iris diaphragm 4, an image interpolating process is carried out by supplying the temporarily stored image information from the image information temporary storing means 152 to an image interpolating means 153. This process enables the moving image to be outputted from a video signal output part 154 without any fluctuation in its luminance.

In the event of an extremely long stopping-down time, however, the interpolating process would give some unnatural impression as one and the same scene would be repeatedly outputted during this period. However, the process gives no such unnatural impression as long as the stopping-down time is within a normal length of time.

As described above, the second embodiment is arranged such that, in a case where a still picture taking operation is performed by using the still image shooting means while the moving image shooting operation is still in process by using the video camera function, the gain of the amplifier is controlled in association with the action of a light quantity restricting member (diaphragm) when the light quantity restricting member is caused to act. The second embodiment is, therefore, capable of adequately preventing the fluctuations of moving images from taking place when a still picture taking operation is performed.

Further, the second embodiment is arranged to temporarily store, in the image information temporary storing means, the image information obtained by the image sensor immediately before the light quantity restricting member is caused to act and to output the temporarily stored image information in association with the action of the light quantity restricting member. That arrangement enables the second embodiment to give moving images without fluctuations in luminance even in cases where the fluctuations of luminance cannot be completely corrected by controlling the gain of the amplifier.

Figure 7:
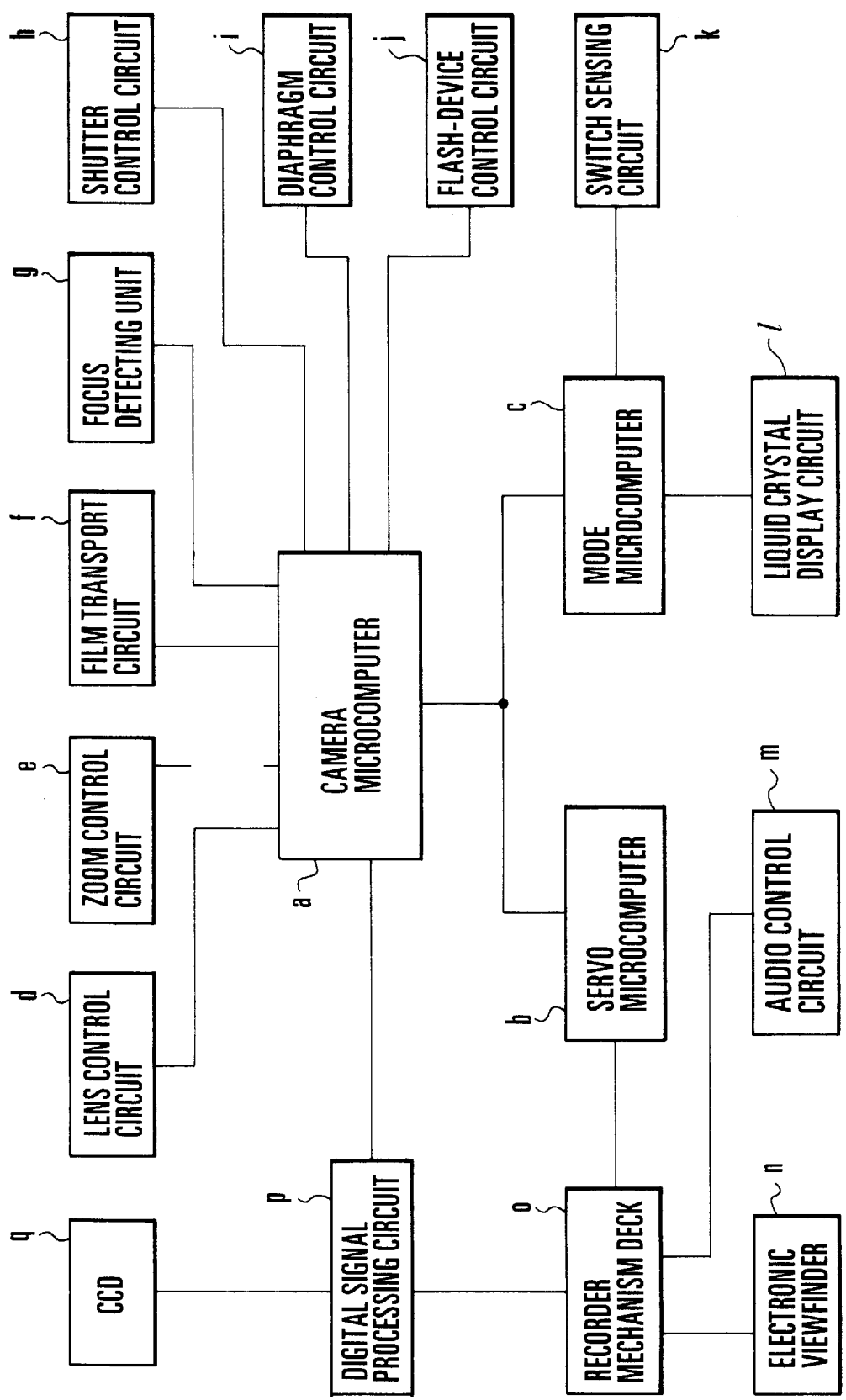
FIG. 7 is a block diagram showing the system arrangement of a third embodiment of this invention.

A third embodiment of this invention is arranged as shown in FIG. 7, which is a block diagram showing the system control arrangement of the third embodiment. In FIG. 7, reference symbol "a" denotes a camera microcomputer. The camera microcomputer "a" controls various still picture taking actions such as lens zooming and automatic focusing actions, automatic film winding and exposure control. A servo microcomputer "b" controls a recorder mechanism deck "o" to cause it to carry out recording, reproduction, etc. A mode microcomputer "c" is arranged to receive, from a switch sensing circuit "k", information on the switching actions of various switches including switches SW1 and SW2, to decide a mode, etc., and to control displays and each of other microcomputers by conducting communication with the camera microcomputer "a", the servo microcomputer "b" and a liquid crystal display circuit "l".

A lens control circuit "d" is arranged to control a distance ring of a photo-taking lens (not shown) in accordance with a control signal from the camera microcomputer "a". A zoom control circuit "e" is arranged to control a zoom ring (not shown) in accordance with a control signal from the camera microcomputer "a". A film transport circuit "f" is arranged to control film transporting actions such as film winding by one frame portion and film prewinding in accordance with a control signal from the camera microcomputer "a".

A focus detecting unit "g" consists of some number of line sensors arranged according to an image plane, and a driving circuit. The driving circuit is arranged to control the accumulating action of each line sensor. The camera microcomputer "a" is arranged to detect an in-focus position where the photo-taking lens is correctly focused on the object of shooting by receiving data accumulated by each line sensor (an object image signal) and by carrying out an arithmetic operation in accordance with a known phase difference detecting method. A shutter control circuit "h" is arranged to control a shutter unit (not shown) in accordance with a control signal from the camera microcomputer "a". A diaphragm control circuit "i" is arranged to control both a diaphragm 4 for film and a diaphragm 11 for video in accordance with information received from the camera microcomputer "a".

A flash-device control circuit "j" is arranged to control the emission and adjustment of flash light of the flash device. The flash-device control circuit "j" consists of known circuits including a circuit which accumulates electric charge for flashing, a xenon lamp which is a flashing part, a trigger circuit, a circuit which brings the flashing action to a stop, a circuit which measures light reflected from the surface of the film, an integrating circuit, etc. The flash device begins to flash when an X-sync contact is turned on by the travel of a leading curtain of the shutter unit.

A switch sensing circuit "k" is arranged to constantly detect the positions of switches. In answer to an instruction from the mode microcomputer "c", the switch sensing circuit "k" sends information on the position of any of various switches including a trigger switch for video moving image shooting, a still-image shooting preparation switch SW1, a release switch SW2, etc. The communication with the switch sensing circuit "k" enables the mode microcomputer "c" to judge the camera to be in a video shooting mode if the still-image shooting preparation switch SW1 is off (in an off-state) while the video moving-image shooting trigger switch is on (in an on-state), to be in a still image shooting mode if the still-image shooting preparation switch SW1 is on while the video moving-image shooting trigger switch is off, and to be in a concurrent shooting mode if the video moving-image shooting trigger switch is on while the still-image shooting preparation switch SW1 is also on.

A liquid crystal display circuit "l" is arranged to display the amount of electric energy remaining in the battery in response to an instruction from the mode microcomputer "c". An audio control circuit "m" is arranged to perform various audio processes such as amplifying an audio signal coming from a microphone and to supply the amplified audio signal to a recorder mechanism deck "o". An electronic viewfinder "n" is arranged to receive a video signal from the recorder mechanism deck "o" for monitoring. The recorder mechanism deck "o" is arranged to control reproduction, image recording, a search, etc., in accordance with instructions received from the servo microcomputer "b". A digital signal processing circuit "p" is arranged to perform a digital signal processing action on image data coming from a CCD "q" (image sensor) and to supply its output to the recorder mechanism deck "o". The CCD "q" is arranged to output image data.

Figure 8:
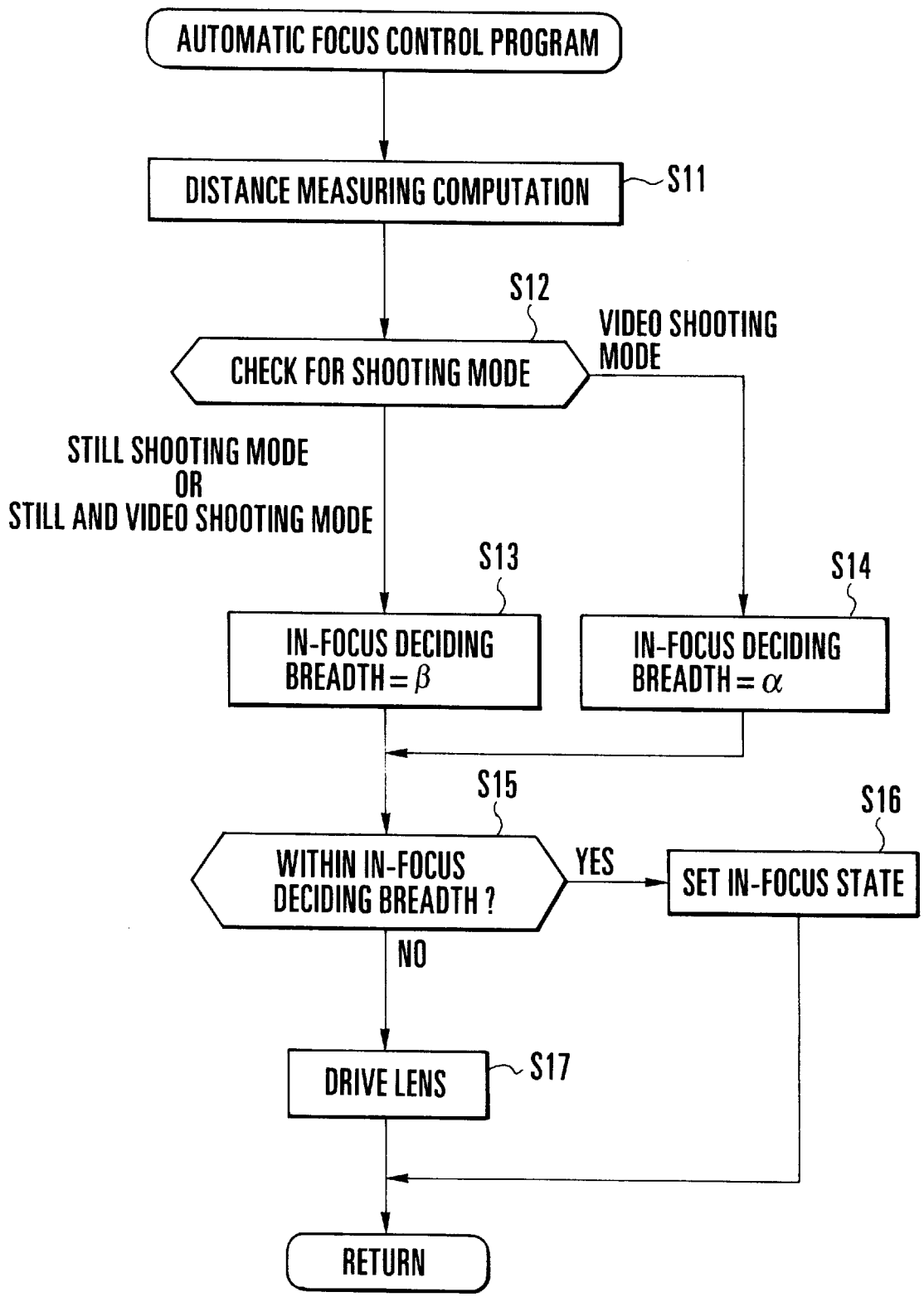
FIG. 8 is a flow chart showing an automatic focusing program of the third embodiment.

FIG. 8 is a flow chart showing an automatic focus control program which represents a feature of the third embodiment. The focus detecting and control operation according to the program is described with reference to FIG. 8 as follows.

At a step S11, a distance (defocus amount) measuring computation is performed. At this step, the above-stated phase difference deviation detecting method is carried out on an object image outputted from the automatic focus detecting device 15 to find how much the object is deviating from an in-focus position of the photo-taking lens (defocus amount). At a step S12, a check is made for the current shooting mode. If the mode is a video shooting mode, the flow of operation comes to a step S14 to set an in-focus deciding breadth at $\alpha$. If the mode is either a still shooting mode or a still and video shooting mode, the flow comes to a step S13 to set the in-focus deciding breadth at $\beta$. The breadth $\beta$ is smaller than the breadth $\alpha$.

At a step S15, a check is made to find if the focused state is within an in-focus range. In other words, the defocus amount which is obtained by computation by the step S11 is examined to find if it is within the in-focus deciding breadth. If so, the flow comes to a step S16. At the step S16, an in-focus state is set. A display is made to show the in-focus state and the focus (detecting) adjustment program comes to an end.

If the focused state is found at the step S15 to be outside of the in-focus range, the flow comes to a step S17 to drive the lens. At the step S17, the lens position is shifted to an in-focus position by driving the lens to move to an extent computed on the basis of the defocus amount found by the step S11. The flow of operation then returns to its start. The automatic focus adjustment is thus carried out by changing the in-focus deciding breadth according to the shooting mode.

As described above, in the case of a concurrent shooting mode in which video image shooting and still image (film)

shooting are to be carried out at the same time, the third embodiment is arranged to decide an in-focus state in accordance with a narrower in-focus deciding breadth (range) set for the still shooting mode. This arrangement effectively prevents occurrence of such a trouble that the still image shooting is carried out in an insufficiently focused state while the video shooting is carried out in an in-focus state. The third embodiment thus enables both the video shooting and the still image shooting to be carried out in well-focused states.

What is claimed is:

1. A camera comprising:
   a) a first image pickup device for picking up a still image by using a silver-halide film;
   b) a second image pickup device for electrically picking up a moving image by using a photoelectric conversion element; and
   c) an image pickup optical system for guiding an image light flux both to said first image pickup device and said second image pickup device, including:
      c-1) a fixed half mirror for guiding the image light flux both to said first image pickup device and said second image pickup device;
      c-2) a first light quantity adjusting device provided for said first image pickup device for adjusting said image light flux in response to an input signal, the first light quantity adjusting device being adjustable so as to make variable the image light flux; and
      c-3) a second light quantity adjusting device provided for said second image pickup device for adjusting image light flux as adjusted by said first light quantity adjusting device, the second light quantity adjusting device being adjustable so as to make variable the image light flux.

2. A camera according to claim 1, wherein said first image pickup device includes a shutter.

3. A camera according to claim 1, wherein said first light quantity adjusting device is arranged to change from a full open state to a stopped-down state only when picking up a still image, and wherein said second light quantity adjusting device is arranged to vary a stopped-down amount thereof always according to a luminance of the image light flux when picking up a moving image.

4. A camera according to claim 1, further comprising a focus detecting device arranged to detect focus by using the image light flux obtained between said half mirror and said first image pickup device.

5. A camera according to claim 1, further comprising a cassette housing part arranged to house a video tape cassette containing a tape on which the moving image picked up by said photoelectric conversion element is to be recorded.

6. A camera according to claim 1, wherein said image pickup optical system includes a reducing optical system arranged to guide a reduced image light flux to said second image pickup device.

7. A camera according to claim 6, wherein said second light quantity adjusting device is disposed within said reducing optical system.

8. A camera according to claim 1, further comprising a viewfinder optical system arranged to make observable an image displayed by a display device arranged to display the moving image picked up by said photoelectric conversion element.

9. A camera according to claim 8, wherein said viewfinder optical system includes a reflecting mirror arranged to totally reflect the image displayed by said display device and an eyepiece.

10. A camera according to claim 1, wherein said image pickup optical system is arranged to guide light passing through said half mirror to said first image pickup device and to guide light reflected by said half mirror to said second image pickup device.

11. A camera according to claim 10, wherein said first light quantity adjusting device is arranged to change from a full open state to a stopped-down state only when a still image, and wherein said second light quantity adjusting device is arranged to change a stopped-down amount thereof always according to a luminance of the image light flux when picking up a moving image.

12. A camera according to claim 10, wherein said image pickup optical system includes a reflecting mirror arranged to totally reflect the light reflected by said half mirror and a reducing optical system arranged to reduce the image light flux totally reflected by said reflecting mirror and guide the reduced image light flux to said second image pickup device.

13. A camera according to claim 12, wherein said image pickup optical system has a plurality of field lenses provided for pupil adjustment of the image light flux and disposed on an optical axis between said half mirror and said reflecting mirror.

14. A camera according to claim 13, wherein said plurality of field lenses are arranged in such a way as to have an aerial image formed between said field lenses in a position which is equivalent to a surface of the silver-halide film.

15. A camera according to claim 12, further comprising a viewfinder optical system arranged to make observable an image displayed by a display device arranged to display the moving image picked up by said photoelectric conversion element.

16. A camera according to claim 15, wherein said viewfinder optical system is swingably supported by a camera body.

17. A camera according to claim 10, further comprising a focus detecting device arranged to detect focus by using the image light flux obtained between said half mirror and said first image pickup device.

18. A camera comprising:
   a) a first image pickup device arranged to pick up a still image by using a silver-halide film;
   b) a second image pickup device arranged to electrically pick up a moving image by using a photoelectric conversion element;
   c) an image pickup optical system arranged to guide an image light flux both to said first image pickup device and said second image pickup device, said image pickup optical system including a first light quantity adjusting device provided for said first image pickup device and settable in response to an input signal, the first light quantity adjusting device being adjustable so as to make variable the image light flux, and a second light quantity adjusting device provided for said second image pickup device and arranged to adjust the image light flux which has been adjusted by said first light quantity adjusting device, the second light quantity adjusting device being adjustable so as to make variable the image light flux; and
   d) a control circuit device for controlling said first light quantity adjusting device and said second light quantity adjusting device, said control circuit device controlling both said first light adjusting device and said second light adjusting device to be brought into stopped-down states when a still image is to be picked up by said first image while said second image pickup device is in process of picking up a moving image.

19. A camera according to claim 18, wherein said control circuit device is arranged to determine a stopped-down aperture diameter of said first light quantity adjusting device according to at least one of information items including a sensitivity of the silver-halide film, a shutter speed, an accumulation time of said photoelectric conversion element, a shooting distance, a focal length, F number and T number of said image pickup optical system and a luminance of a picked-up object.

20. A camera according to claim 18, wherein said image pickup optical system includes a fixed half mirror arranged to guide the image light flux both to said first image pickup device and said second image pickup device.

21. A camera according to claim 20, wherein said image pickup optical system is arranged to guide light passing through said half mirror to said first image pickup device and to guide light reflected by said half mirror to said second image pickup device.

22. A camera according to claim 21, wherein said image pickup optical system includes a reflecting mirror arranged to totally reflect the light reflected by said half mirror and a reducing optical system arranged to reduce the image light flux totally reflected by said reflecting mirror and guide the reduced image light flux to said second image pickup device.

23. A camera according to claim 22, further comprising a viewfinder optical system arranged to make observable an image displayed by a display device arranged to display the moving image picked up by said photoelectric conversion element.

24. A camera according to claim 18, wherein said control circuit device is arranged to determine a stopped-down aperture diameter of said first light quantity adjusting device to be such an aperture diameter that does not block an image light flux defined by a stopped-down aperture diameter of said second light quantity adjusting device, when a still image is to be picked up by said first image pickup device while said second image pickup device is in process of picking up a moving image.

25. A camera according to claim 24, wherein said control circuit device is arranged to determine the stopped-down aperture diameter of said first light quantity adjusting device according to at least one of factors including a sensitivity of the silver-halide film, a shutter speed, an accumulation time of said photoelectric conversion element, a shooting distance, a focal length, F number and T number of said image pickup optical system and a luminance of a picked-up object.

26. A camera according to claim 24, wherein said image pickup optical system includes a fixed half mirror arranged to guide the image light flux both to said first image pickup device and said second image pickup device.

27. A camera according to claim 26, wherein said image pickup optical system is arranged to guide light passing through said half mirror to said first image pickup device and to guide light reflected by said half mirror to said second image pickup device.

28. A camera according to claim 27, wherein said image pickup optical system includes a reflecting mirror arranged to totally reflect the light reflected by said half mirror and a reducing optical system arranged to reduce the image light flux totally reflected by said reflecting mirror and guide the reduced image light flux to said second image pickup device.

29. A camera comprising:
a) a first image pickup device arranged to pick up a still image by using a silver-halide film;
b) a second image pickup device arranged to electrically pick up a moving image by using a photoelectric conversion element;
c) an image pickup optical system arranged to guide an image light flux both to said first image pickup device and said second image pickup device, said image pickup optical system including a first light quantity adjusting device provided for said first image pickup device and settable in response to an input signal, the first light quantity adjusting device being adjustable so as to make variable the image light flux, and a second light quantity adjusting device provided for said second image pickup device and arranged to adjust the image light flux which has been adjusted by said first light quantity adjusting device, the second light quantity adjusting device being adjustable so as to make variable the image light flux; and
d) a moving image correcting circuit device for performing a predetermined processing action on the moving image picked up by said second image pickup device when the still image is picked up by said first image pickup device, said moving image correcting circuit device being arranged to suppress output fluctuations of the moving image when a light quantity of the image flux is adjusted by said first light quantity adjusting device.

30. A camera according to claim 29, wherein a stopped-down aperture diameter of said first light quantity adjusting device is determined according to at least one of information items including a sensitivity of the silver-halide film, a shutter speed, an accumulation time of said photoelectric conversion element, a shooting distance, a focal length, F number and T number of said image pickup optical system and a luminance of a pickedup object.

31. A camera according to claim 29, wherein said moving image correcting circuit device is arranged to amplify image information obtained from said photoelectric conversion element on the basis of a stopped-down aperture value or a stopping-down time of said first light quantity adjusting device.

32. A camera according to claim 31, wherein said image pickup optical system includes a fixed half mirror arranged to guide the image light flux both to said first image pickup device and said second image pickup device.

33. A camera according to claim 32, wherein said image pickup optical system is arranged to guide light passing through said half mirror to said first image pickup device and to guide light reflected by said half mirror to said second image pickup device.

34. A camera according to claim 33, wherein said image pickup optical system includes a reflecting mirror arranged to totally reflect the light reflected by said half mirror and a reducing optical system arranged to reduce the image light flux totally reflected by said reflecting mirror and guide the reduced image light flux to said second image pickup device.

35. A camera according to claim 29, wherein said moving image correcting circuit device is arranged to temporarily store image information obtained from said photoelectric conversion element and to output the image information obtained immediately before the commencement of a stopping-down process of said first light quantity adjusting device when said first light quantity adjusting device is stopped down.

36. A camera according to claim 35, wherein said image pickup optical system includes a fixed half mirror arranged to guide the image light flux both to said first image pickup device and said second image pickup device.

37. A camera according to claim 36, wherein said image pickup optical system is arranged to guide light passing through said half mirror to said first image pickup device and to guide light reflected by said half mirror to said second image pickup device.

38. A camera according to claim 37, wherein said image pickup optical system includes a reflecting mirror arranged to totally reflect the light reflected by said half mirror and a reducing optical system arranged to reduce the image light flux totally reflected by said reflecting mirror and guide the reduced image light flux to said second image pickup device.

39. A camera according to claim 29, wherein said image pickup optical system includes a fixed half mirror which is arranged to guide the image light flux both to said first and second image pickup devices.

40. A camera according to claim 39, wherein said image pickup optical system is arranged to guide light passing through said half mirror to said first image pickup device and to guide light reflected by said half mirror to said second image pickup device.

41. A camera according to claim 40, wherein said image pickup optical system includes a reflecting mirror arranged to totally reflect the light reflected by said half mirror and a reducing optical system arranged to reduce the image light flux totally reflected by said reflecting mirror and guide the reduced image light flux to said second image pickup device.

* * * * *